(12) United States Patent
Yoshii et al.

(10) Patent No.: US 7,864,698 B2
(45) Date of Patent: Jan. 4, 2011

(54) RADIO COMMUNICATION DEVICE AND CQI GENERATION METHOD

(75) Inventors: Isamu Yoshii, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 120 days.

(21) Appl. No.: 12/306,485

(22) PCT Filed: Jun. 25, 2007

(86) PCT No.: PCT/JP2007/062715

§ 371 (c)(1),
(2), (4) Date: Dec. 23, 2008

(87) PCT Pub. No.: WO2008/001727

PCT Pub. Date: Jan. 3, 2008

(65) Prior Publication Data

US 2009/0279446 A1    Nov. 12, 2009

(30) Foreign Application Priority Data

Jun. 26, 2006  (JP) ............................. 2006-175819
Nov. 29, 2006  (JP) ............................. 2006-322347

(51) Int. Cl.
*H04L 1/00* (2006.01)
(52) U.S. Cl. .................. 370/252; 370/203; 370/437; 370/468
(58) Field of Classification Search .................. 370/252, 370/203, 208, 343, 344, 437, 468
See application file for complete search history.

(56) References Cited

U.S. PATENT DOCUMENTS

2005/0201295 A1   9/2005  Kim

2006/0146760 A1 *  7/2006  Khandekar et al. ............ 370/335
2006/0192205 A1    8/2006  Yamazaki
2007/0115796 A1    5/2007  Jeong (Continued)

FOREIGN PATENT DOCUMENTS

EP    1 901 447    3/2008

(Continued)

OTHER PUBLICATIONS

3GPP TSG RAN1 #44, R1-060381, "Frequency Domain Scheduling for E-UTRA," Denver, US, Feb. 13-17, 2006.*

(Continued)

*Primary Examiner*—Ricky Ngo
*Assistant Examiner*—Luat Phung
(74) *Attorney, Agent, or Firm*—Dickinson Wright PLLC

(57) ABSTRACT

It is possible to provide a radio communication device and a CQI generation method capable of reducing the total number of CQI when reporting CQI for each level in a hierarchized RB. In the device and the method, the RB hierarchy is made as follows: a plurality of groups each consisting of the same number of RB are made to be one level, a group consisting of a plenty of RB is made to be a lower level, and a group consisting of a small number of RB is made to be a higher level. UE reports CQI for each level to Node B according to the RB reception quality at a longer cycle for lower level and at a shorter cycle for a higher level.

8 Claims, 12 Drawing Sheets

| | NUMBER OF BITS FOR CQI NUMBERS | NUMBER OF BITS FOR RB NUMBERS | CYCLE | |
|---|---|---|---|---|
| n=1 | 5 | 0 | 8msec | LONG CYCLE |
| n=2 | 5 | 2 | 4msec | MEDIUM CYCLE |
| n=3 | 5 | 3 | 2msec | MEDIUM CYCLE |
| n=4 | 5 | 4 | 0.5msec | SHORT CYCLE |

U.S. PATENT DOCUMENTS

2007/0195897 A1    8/2007    Cheng
2007/0258366 A1    11/2007    Imamura

FOREIGN PATENT DOCUMENTS

| JP | 2001-051622 | 2/2001 |
| --- | --- | --- |
| JP | 2002-320262 | 10/2002 |
| JP | 2007-068180 | 3/2007 |
| WO | 2005/088870 | 9/2005 |
| WO | 2005/089000 | 9/2005 |
| WO | 2006/059566 | 6/2006 |
| WO | 2007/020958 | 2/2007 |

OTHER PUBLICATIONS

International Search Report dated Sep. 4, 2007.
3GPP TSG RAN1 #44, R1-060381, "Frequency Domain Scheduling for E-UTRA," Denver, US, Feb. 13-17, 2006, pp. 1-9, p. 3, line 14.

* cited by examiner

|  | NUMBER OF BITS FOR CQI NUMBERS | NUMBER OF BITS FOR RB NUMBERS | CYCLE | |
|---|---|---|---|---|
| n=1 | 5 | 0 | 8msec | LONG CYCLE |
| n=2 | 5 | 2 | 4msec | MEDIUM CYCLE |
| n=3 | 5 | 3 | 2msec | MEDIUM CYCLE |
| n=4 | 5 | 4 | 0.5msec | SHORT CYCLE |

FIG.4

| | NUMBER OF BITS FOR CQI NUMBERS | CYCLE |
|---|---|---|
| n=1 | 2 | 8msec |
| n=2 | 3 | 4msec |
| n=3 | 4 | 2msec |
| n=4 | 5 | 0.5msec |

FIG.6

| CQI | HIGHER BITS | LOWER BITS | MODULATION SCHEME | CODING RATE | NUMBER OF INFORMATION BITS |
|---|---|---|---|---|---|
| 1 | 1 | 1 | QPSK +Rep=8 | 1/8 | 100 |
| 2 | 1 | 2 | QPSK +Rep=8 | 1/4 | 200 |
| 3 | 1 | 3 | QPSK +Rep=8 | 3/8 | 300 |
| 4 | 1 | 4 | QPSK +Rep=8 | 1/2 | 400 |
| 5 | 2 | 1 | QPSK +Rep=4 | 5/16 | 500 |
| 6 | 2 | 2 | QPSK +Rep=4 | 3/8 | 600 |
| 7 | 2 | 3 | QPSK +Rep=4 | 7/16 | 700 |
| 8 | 2 | 4 | QPSK +Rep=4 | 1/2 | 800 |
| 9 | 3 | 1 | QPSK +Rep=2 | 9/32 | 900 |
| 10 | 3 | 2 | QPSK +Rep=2 | 5/16 | 1000 |
| 11 | 3 | 3 | QPSK +Rep=2 | 11/32 | 1100 |
| 12 | 3 | 4 | QPSK +Rep=2 | 3/8 | 1200 |
| 13 | 4 | 1 | QPSK | 1/4 | 1600 |
| 14 | 4 | 2 | QPSK | 5/16 | 2000 |
| 15 | 4 | 3 | QPSK | 3/8 | 2400 |
| 16 | 4 | 4 | QPSK | 7/16 | 2800 |
| 17 | 5 | 1 | 16QAM | 1/4 | 3200 |
| 18 | 5 | 2 | 16QAM | 5/16 | 4000 |
| 19 | 5 | 3 | 16QAM | 3/8 | 4800 |
| 20 | 5 | 4 | 16QAM | 7/16 | 5600 |
| 21 | 6 | 1 | 64QAM | 1/3 | 6400 |
| 22 | 6 | 2 | 64QAM | 1/4 | 9600 |
| 23 | 6 | 3 | 64QAM | 3/4 | 14400 |
| 24 | 6 | 4 | 64QAM | 7/8 | 16800 |

FIG.7

|  | NUMBER OF HIGHER BITS | CYCLE | NUMBER OF LOWER BITS | CYCLE |
|---|---|---|---|---|
| n=1 | 3 | 8msec | 2 | 8msec |
| n=2 | 3 | 8msec | 2 | 4msec |
| n=3 | 3 | 8msec | 2 | 2msec |
| n=4 | 3 | 8msec | 2 | 0.5msec |

FIG.8

| CQI | HIGHER BITS | LOWER ONE BIT | LOWEST TWO BITS | MODULATION SCHEME | CODING RATE | NUMBER OF INFORMATION BITS |
|---|---|---|---|---|---|---|
| 1 | 1 | 1 | 1 | QPSK +Rep=8 | 1/8 | 100 |
| 2 | | | 2 | | 1/4 | 200 |
| 3 | | 2 | 3 | | 3/8 | 300 |
| 4 | | | 4 | | 1/2 | 400 |
| 5 | 2 | 1 | 1 | QPSK +Rep=4 | 5/16 | 500 |
| 6 | | | 2 | | 3/8 | 600 |
| 7 | | 2 | 3 | | 7/16 | 700 |
| 8 | | | 4 | | 1/2 | 800 |
| 9 | 3 | 1 | 1 | QPSK +Rep=2 | 9/32 | 900 |
| 10 | | | 2 | | 5/16 | 1000 |
| 11 | | 2 | 3 | | 11/32 | 1100 |
| 12 | | | 4 | | 3/8 | 1200 |
| 13 | 4 | 1 | 1 | QPSK | 1/4 | 1600 |
| 14 | | | 2 | | 5/16 | 2000 |
| 15 | | 2 | 3 | | 3/8 | 2400 |
| 16 | | | 4 | | 7/16 | 2800 |
| 17 | 5 | 1 | 1 | 16QAM | 1/4 | 3200 |
| 18 | | | 2 | | 5/16 | 4000 |
| 19 | | 2 | 3 | | 3/8 | 4800 |
| 20 | | | 4 | | 7/16 | 5600 |
| 21 | 6 | 1 | 1 | 64QAM | 1/3 | 6400 |
| 22 | | | 2 | | 1/4 | 9600 |
| 23 | | 2 | 3 | | 3/4 | 14400 |
| 24 | | | 4 | | 7/8 | 16800 |

FIG.9

| | NUMBER OF HIGHER BITS | CYCLE | NUMBER OF LOWER BITS | CYCLE |
|---|---|---|---|---|
| n=1 | 3 | 8msec | 0 | 8msec |
| n=2 | 3 | 8msec | 1 | 4msec |
| n=3 | 3 | 8msec | 1 | 2msec |
| n=4 | 3 | 8msec | 2 | 0.5msec |

RADIO COMMUNICATION DEVICE AND CQI GENERATION METHOD

TECHNICAL FIELD

The present invention relates to a radio communication apparatus and a CQI generation method.

BACKGROUND ART

A CQI (Channel Quality Indicator), which is used for, for example, selecting an MCS (Modulation and Coding Scheme), is reported from UE (User Equipment) to node B. If the UE reports CQIs frequently, although the accuracy of MCS selection improves at the node B, the uplink channel becomes busy. For this reason, studies are underway to reduce the total number of CQIs.

Non-patent document 1 discloses a method of layering RBs (Resource Blocks) and reporting the maximum CQI on a per layered RB basis. FIG. 1 shows layered RBs. FIG. 1 shows a case where twelve RBs are each provided and classified as four layers. Layer 1 (n=1) groups all the RBs into one group, layer 2 (n=2) equally groups the RBs into three every four RBs. Further, layer 3 (n=3) equally groups the RBs into six every two RBs, and layer 4 (n=4) groups the RBs every one RB (i.e. in RB units).

The CQI selection method in the case where RBs are layered, will be explained. First, in layer 1, the CQI is selected based on an average SIR of all RBs. In layer 2, the CQI is selected based on the maximum average SIR among the average SIRs every four RBs, and, similarly, in layer 3, the CQI is selected based on the maximum average SIR among the average SIRs every two RBs. In layer 4, the CQI is selected based on the maximum SIR among the SIRs per RB.

FIG. 2 shows channel conditions and reporting CQIs on a per layer basis shown in FIG. 1. In FIG. 2, the bold solid line shows the CQI level when the CQI is reported per RB, the thin solid line (straight line) shows the CQI level reported in layer 1 (n=1). Further, the dotted line shows the CQI level reported in layer 2 (n=2), the dash-dotted line shows the CQI level reported in layer 3 (n=3) and the dash-two dot line shows the CQI level reported in layer 4.

When there are twelve RBs in total as shown in FIG. 1, and a five bit CQI is reported on a per RB basis, sixty bits are required. However, when RBs are layered and CQIs are reported on a per layer basis, the number of required bits can be reduced to twenty bits.

Although with the above example the average SIR or the maximum SIR value are used as a CQI selection reference, the minimum value may also be used and the maximum and minimum values may also be used.

As described above, CQIs are reported on a per layer basis, and, at the receiving side, CQIs of higher layers are overwritten with CQIs of lower layers and are identified as CQI per RB.

Non-patent Document 1: 3GPP TSG RAN1 #44, R1-060381, "Frequency Domain Scheduling for E-UTRA," Denver, US, February 13-17, 2006

DISCLOSURE OF INVENTION

Problems to be Solved by the Invention

However, lower layers are influenced by a larger number of RBs, so that the speed and range of fluctuation of an SIR is smaller. In contrast, higher layers are reflected by a small number of RBs, so that the speed and range of fluctuation of an SIR is more significant. That is, the speed and range of fluctuation of an SIR vary between layers, and so it is not efficient to report CQIs in lower layers with small fluctuations similar to higher layers.

Where the CQIs are reported on a per layer basis, it is therefore an object of the present invention to provide a radio communication apparatus and a CQI generation method that reduce the total number of CQIs for layered RBs.

Means for Solving the Problem

The radio communication apparatus of the present invention adopts configuration including: a measuring section that measures received quality on a per resource block basis; and a CQI generating section that, where CQIs are provided in layers such that one layer is formed with a plurality of groups each comprising the same number of resource blocks, a group comprising more resource blocks forming a lower layer and a group comprising fewer resource blocks forming a higher layer, based on the measured received quality, generates CQIs to be reported per layer in a longer cycle for the lower layer and in a shorter cycle for the higher layer.

The CQI generation method of the present invention includes steps of: measuring CQI on a per resource block basis; and generating CQIs to be reported per layer, in a longer cycle for a lower layer and in a shorter cycle for a higher layer, where CQIs are provided in layers such that one layer is formed with a plurality of groups each comprising the same number of resource blocks, a group comprising more resource blocks forming the lower layer and a group comprising fewer resource blocks forming the higher layer, based on the measured received quality.

ADVANTAGEOUS EFFECT OF THE INVENTION

The present invention provides an advantage of reducing the total number of CQIs for layered RBs when the CQIs are reported on a per layer basis.

BRIEF DESCRIPTION OF DRAWINGS

FIG. 4 shows the CQI report cycles of the CQI signal generating section shown in FIG. 3;

FIG. 6 shows the number of bits for CQI numbers and the CQI report cycles;

FIG. 7 shows the associations between CQI and MCS according to Embodiment 2 of the present invention;

FIG. 8 shows the CQI report cycles according to Embodiment 2 of the present invention;

FIG. 9 shows the associations between CQI and MCS according to Embodiment 3 of the present invention;

FIG. 10 shows the CQI report cycles according to Embodiment 3 of the present invention;

BEST MODE FOR CARRYING OUT THE INVENTION

Figure 1:
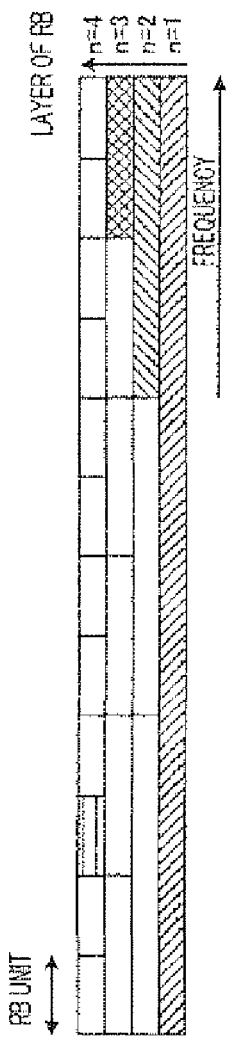
FIG. 1 shows layered RBs.
Figure 2:
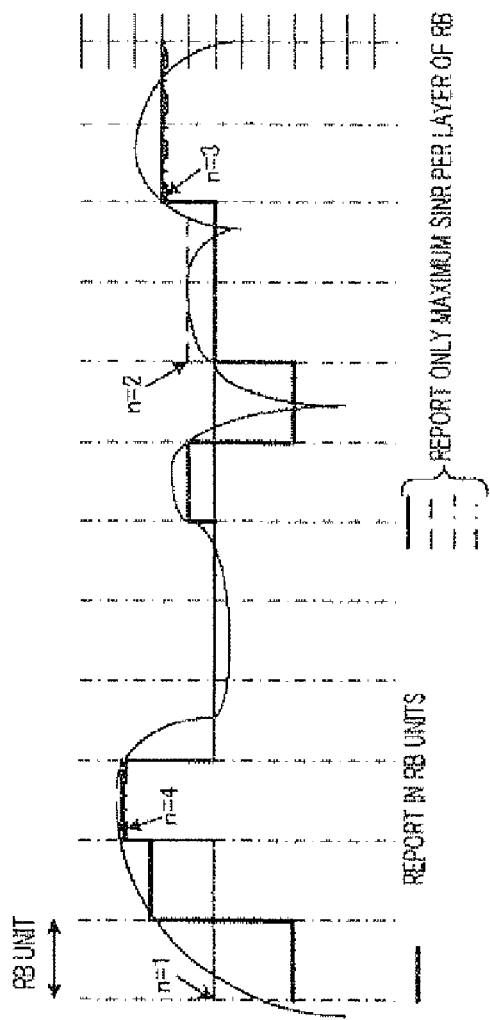
FIG. 2 shows channel conditions and reporting CQIs every layer shown in FIG. 1.

Now, embodiments of the present invention will be described in detail with reference to the accompanying drawings. In the present embodiment, the layered structure shown in FIG. 1 will be explained with an example.

Embodiment 1

Figure 3:
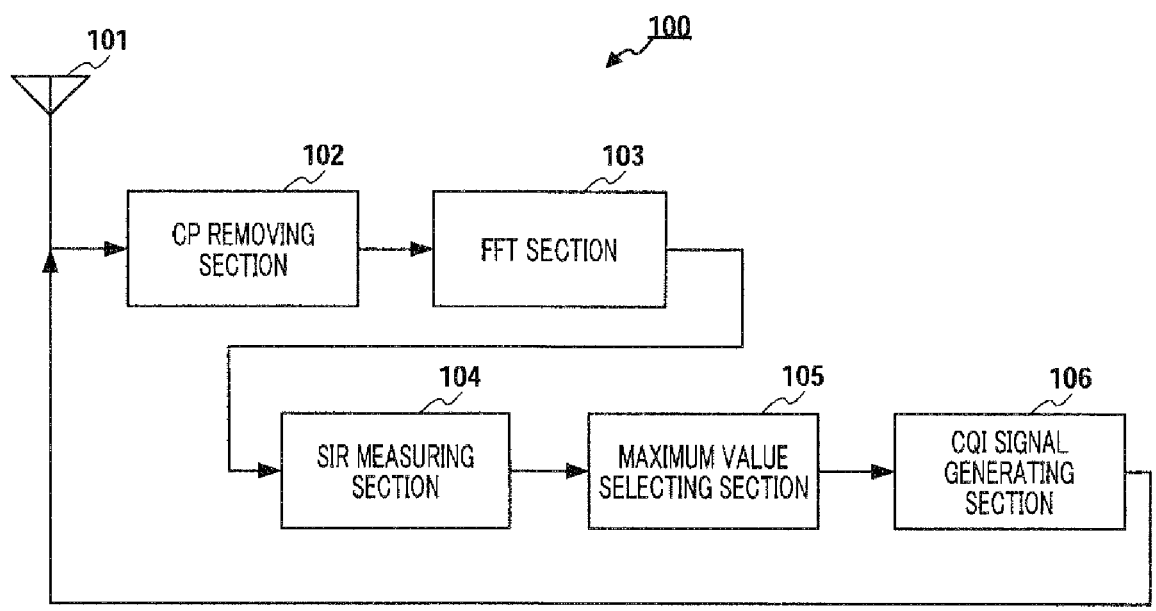
FIG. 3 is a block diagram showing the configuration of the UE according to Embodiments 1 to 5 of the present invention.

FIG. 3 is a block diagram showing the configuration of UE 100 according to Embodiment 1 of the present invention. In this figure, CP removing section 102 removes a CP (cyclic prefix) from a pilot signal received via antenna 101, and outputs the pilot signal without a CP to FFT section 103.

FFT section 103 performs FFT (Fast Fourier Transform) processing to the pilot signal outputted from CP removing section 102, converts the time domain signal into a frequency domain signal and outputs it to SIR measuring section 104.

SIR measuring section 104 measures the SIR of the pilot signal outputted from FFT section 103 per RB, and outputs the measured SIRs to maximum value selecting section 105.

Maximum value selecting section 105 calculates SIR average values for each RB group outputted from SIR measuring section 104 and selects the maximum value per layer from the calculated average values. The selected maximum average SIR and the RB group number are outputted to CQI signal generating section 106 on a per layer basis.

Based on the selected maximum average SIR and the RB group number outputted from maximum value selecting section 105, CQI signal generating section 106 generates CQI signals of different cycles between layers and transmits the generated CQI signals via antenna 101. The CQI signal includes the CQI level, layer identification and RB group number.

FIG. 4 shows the CQI report cycles of CQI signal generating section 106 shown in FIG. 3. This figure shows the CQI report cycles of four layers (n=1 to 4). That is, the CQI is reported every eight milliseconds in layer 1 (n=1) and the CQI is reported every four milliseconds in layer 2 (n=2). Similarly, the CQI is reported every two milliseconds in layer 3 (n=3) and the CQI is reported every 0.5 milliseconds in layer 4 (n=4). In FIG. 4, the number of bits for CQI number is five in all layers, and, the number of RBs averaged varies between layers, so that the number of bits for RB numbers also varies between layers.

In this way, shortening the report cycle for higher layers makes it possible to follow the fluctuation speed of the maximum SIR value (or minimum SIR value). On the other hand, lengthening the report cycle for lower layers makes it possible to follow the fluctuation speed of maximum SIR value (or minimum SIR value) and reduce the total number of CQIs.

Figure 5:
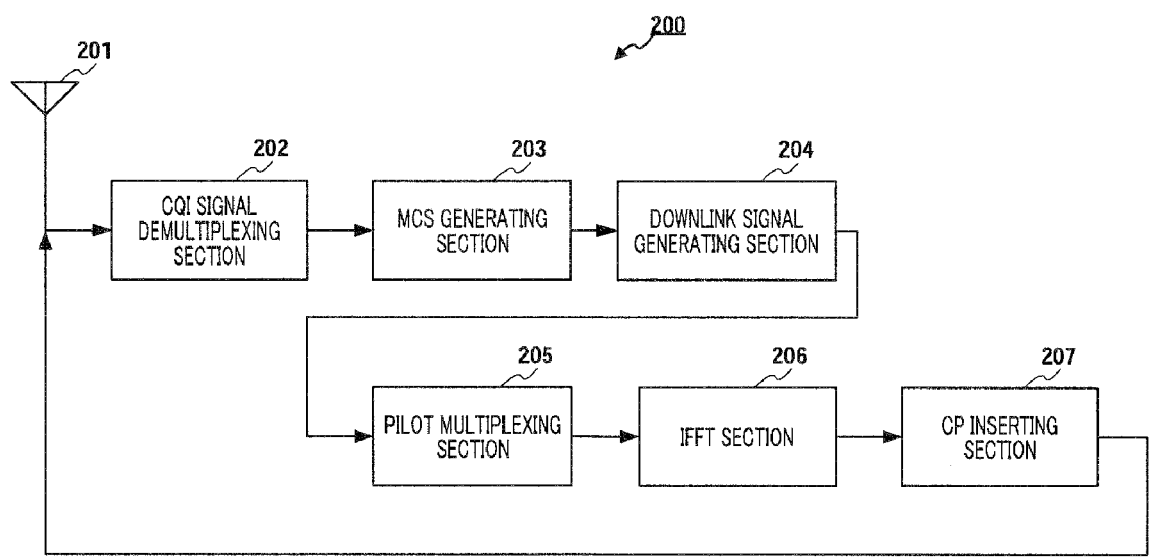
FIG. 5 is a block diagram showing the configuration of the node B according to Embodiments 1, 4 and 6.

FIG. 5 is a block diagram showing the configuration of node B 200 according to Embodiment 1. In this figure, CQI signal demultiplexing section 202 demultiplexes a CQI signal received via antenna 201 per layer, and outputs the CQI signals demultiplexed per layer to MCS generating section 203.

MCS generating section 203 overwrites the CQIs of lower layers with the CQIs of higher layers, among the CQI signals outputted from CQI signal demultiplexing section 202. Further, based on the CQIs per RB, MCS generating section 203 generates MCSs per RB, and outputs the generated MCSs to downlink signal generating section 204.

Downlink signal generating section 204 generates a downlink signal according to the MCSs per RB outputted from MCS generating section 203, and outputs the generated downlink signal to pilot multiplexing section 205.

Pilot multiplexing section 205 multiplexes a pilot signal with the downlink signal outputted from downlink signal generating section 204, and outputs the multiplex signal to IFFT section 206.

IFFT section 206 performs IFFT (Inverse Fast Fourier Transform) processing on the signal outputted from pilot multiplexing section 205, converts the frequency domain signal into a time domain signal and outputs it to CP inserting section 207.

CP inserting section 207 inserts a CP into the signal outputted from IFFT section 206, and transmits the signal with a CP via antenna 201.

In this way, according to Embodiment 1, a plurality of RB groups formed with the same number of RBs make one layer, a lower layer is formed with RB groups including a large number of RBs, and a higher layer is formed with RB groups including a small number of RBs. Accordingly, for the layered RBs, a CQI reported between layers of higher layer is reported for a shorter cycle, and CQI of lower layer is reported for a longer cycle, so that it is possible to report CQIs matching the fluctuation speed of SIR and reduce the total number of CQIs.

As shown in FIG. 6, the number of bits for CQI numbers may be two bits for layer 1 (n=1), three bits for layer 2 (n=2), four bits in layer 3 (n=3), and five bits for layer 4 (n=4). In this way, by increasing the number of bits for CQI numbers for higher layers, it is possible to follow the fluctuation of the maximum (or minimum) SIR value.

Embodiment 2

The configuration of the UE according to Embodiment 2 is the same as shown in FIG. 3 of Embodiment 1, and therefore will be explained with reference to FIG. 3.

FIG. 7 shows the associations between CQIs and MCSs according to Embodiment 2 of the present invention. In this figure, the CQI has twenty four levels, these twenty four levels are grouped every four levels into six groups and specified so as to represent six levels using the higher CQI (the higher three bits). Further, four levels in each group are specified so as to represent four levels using the lower CQI (the lower two bits).

Further, FIG. 8 shows the CQI report cycles according to Embodiment 2 of the present invention. In this figure, the report cycles of the higher bits shown in FIG. 7 are all eight milliseconds in all of the first to fourth layers (n=1 to 4). On the other hand, the report cycles for the lower bits shown in FIG. 7 are eight milliseconds in layer 1, four milliseconds in layer 2 (n=2), two milliseconds in layer 3 (n=3), and 0.5 milliseconds in layer 4 (n=4).

Here, for example, when CQI=10 is reported in the layers, in layer 1 (n=1), "3" of the higher bits and "2" of the lower bits are reported every eight milliseconds. Further, in layer 2 (n=2), "3" of the higher bits is reported every eight milliseconds, and "2" of the lower bits is reported every four milliseconds. Further, in layer 3 (n=3), "3" of the higher bits is reported every eight milliseconds, and "2" of the lower bits is reported every two milliseconds. Furthermore, in layer 4 (n=4), "3" of the higher bits is reported every eight milliseconds, and "2" of the lower bits is reported every 0.5 milliseconds.

In this way, according to Embodiment 2, CQIs are grouped into levels and higher bits and lower bits are provided that designate the groups and CQIs, respectively, so that CQIs are reported per layer using the higher bits and lower bits. At this time, the lower bits are reported every longer cycle for lower layers, and the higher bits are reported for all layers every longest cycle from the cycles of the lower bits, so that it is possible to further reduce the total number of CQIs.

Embodiment 3

The configuration of the UE according to Embodiment 3 is the same as shown in FIG. 3 of Embodiment 1, and therefore will be explained with reference to FIG. 3.

FIG. 9 shows the associations between a CQI and an MCS according to Embodiment 3 of the present invention. In this figure, the CQI has twenty four levels, these twenty-four levels are grouped every four levels into six groups, and specified so as to represent six levels using the higher CQI (i.e. the higher three bits). Further, four levels in each group are grouped into two levels using the middle CQI (one lower bit). Furthermore, the two levels using the middle CQI are specified so as to represent four levels using the lower CQI (i.e. the lowest two bits).

Further, FIG. 10 shows the CQI report cycles according to Embodiment 3 of the present invention. In this figure, the report cycles of the higher bits shown in FIG. 9 are all eight milliseconds in all layers of the first to fourth layers (n=1 to 4) On the other hand, the report cycles for the lower bits shown in FIG. 9 are eight milliseconds in layer 1, four milliseconds in layer 2 (n=2), two milliseconds in layer 3 (n=3), and 0.5 milliseconds in layer 4 (n=4).

Here, for example, when CQI=15 is reported in the layers, in layer 1 (n=1), "4" of the higher bits is reported every eight milliseconds. Further, in layer 2 (n=2), "4" of the higher bits is reported every eight milliseconds, and "2" of the lower one bit is reported every four milliseconds. Further, in layer 3 (n=3), "4" of the higher bits is reported every eight milliseconds, and "2" of the lower one bit is reported every two milliseconds. Furthermore, in layer 4 (n=4), "4" of the higher bits is reported every eight milliseconds, and "3" of the lowest two bits is reported every 0.5 milliseconds.

In this way, according to Embodiment 3, CQIs are grouped into levels and higher bits, lower one bit and the lowest two bits are provided that designate the groups, classify the CQIs into levels in the groups, and designate CQIs, respectively. Accordingly, CQIs are reported every layer using the higher bits, the lower one bit and the lowest two bits, and, by reducing the number of lower bits for lower layers, so that it is possible to further reduce the total number of CQIs.

Embodiment 4

The UE according to Embodiment 4 of the present invention is the same in the configuration as shown in FIG. 3 of Embodiment 1, and partly different in functions. The different parts from Embodiment 1 will be explained with reference to FIG. 3.

In FIG. 3, maximum value selecting section 105 calculates average values of the SIRs for each RB group outputted from SIR measuring section 104 and selects the maximum value per layer from the calculated average values. At this time, when the RB group having the maximum value overlaps with the RB group selected as the maximum SIR in the higher layers, maximum value selecting section 105 removes the part overlapping with higher layers and recalculates the averages of SIRs. Maximum value selecting section 105 outputs the recalculated averaged SIRs to CQI signal generating section 106. However, maximum value selecting section 105 does not output the SIRs for the overlapping part with the higher layers.

Figure 11:
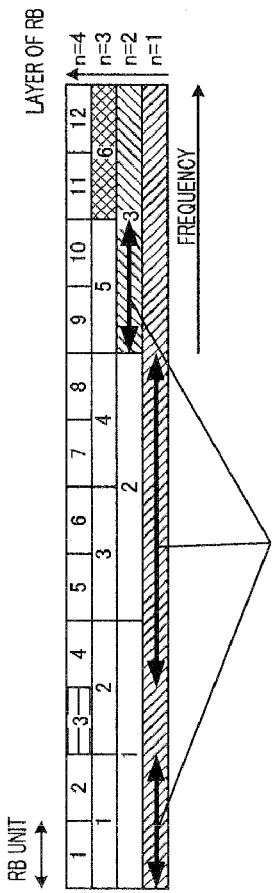
FIG. 11 shows an operation example of generating a CQI signal according to Embodiment 4 of the present invention.

FIG. 11 shows an operation example of generating a CQI signal according to Embodiment 4 of the present invention. In this figure, the SIR of group 3 is maximum for layer 4 (n=4), the SIR of group 6 is maximum for layer 3 (n=3), and the SIR of group 3 is maximum for layer 2 (n=2).

At this time, the RBs of group 3 where the average SIR is maximum in layer 2 overlap with group 6 where the SIR is selected as the maximum in layer 3 of the higher layer. Similarly, in layer 1, part of the RBs overlap with all the RB groups selected in the second to fourth layers.

Incidentally, node B where the CQI is reported with regards to the overlapping RBs overwrites the CQI of lower layer with the CQI of higher layer, and so the CQI of lower layer overlapping with the CQI of higher layer is not used. For the reason, here, in group 3 where the average SIR is the maximum in layer 2, average SIRs are calculated again, not including the part of the RBs overlapping with group 6 selected in layer 3, and a CQI signal corresponding to the calculated SIR is generated. Similarly, in layer 1, an average of SIRs is calculated again, not including the part of the RBs overlapping with group 3 selected in layer 4, group 6 selected in layer 3, and group 3 selected in layer 2, and then a CQI signal corresponding to the calculated SIR is generated.

By this means, the number of RBs to be averaged can be reduced, and a CQI further reflecting actual channel condition can be generated, so that it is possible to improve the accuracy of CQIs reported from layer 2 and layer 1.

The node B according to Embodiment 4 is the same in the configurations and partly different in functions as shown in FIG. 5 of Embodiment 1. The part having different functions as in Embodiment 1 will be explained with reference to FIG. 5.

In FIG. 5, MCS generating section 203 determines whether or not the CQI signals outputted from CQI signal demultiplexing section 202 overlap with the RB groups subjected to CQI reporting in the higher layers. When there is an overlap, the reported CQI is identified as the CQI of the part not reported in the higher layers. When there is not an overlap, the reported CQI is identified as the CQI of the RB group subjected to CQI reporting. Based on the identified CQI, MCS generating section 203 generates MCSs per RB, and outputs the generated MCSs to downlink signal generating section 204.

In this way, according to Embodiment 4, when an RB group where the average SIR is maximum in one layer shares an overlapping part with an RB group selected as CQI reporting target in higher layer, the average SIR is calculated again for the part not including the part overlapping with the RB group of the layer. Accordingly, by generating a CQI signal corresponding to the calculated average SIR, it is possible to improve the accuracy of CQI for the RBs other than the overlapping part with the higher layers.

Embodiment 5

The UE according to Embodiment 5 of the present invention is the same in the configurations as shown in FIG. 3 of Embodiment 1, and partly different in functions. The different parts from Embodiment 1 will be explained with reference to FIG. 3.

In FIG. 3, maximum value selecting section 105 calculates SIR average values for each RB group outputted from SIR measuring section 104 and selects the maximum value per layer from the calculated average values. At this time, when the RB group selected as the maximum average SIR in one layer and the RB group selected in the next higher layer overlap, maximum value selecting section 105 does not include the RB group in the layer overlapping with the next higher layer. Maximum value selecting section 105 selects the RB group where the SIR is maximum in the layer not included the overlapping group. That is, maximum value selecting section 105 selects the RB group of the second greatest SIR in the layer before the overlapping RB group is not included, and outputs the selected second greatest SIR to CQI signal generating section 106.

Figure 12A:
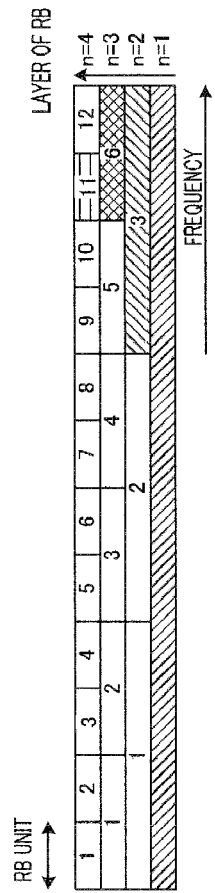
FIG. 12A shows the groups of the maximum SIRs in the layers.
Figure 12B:
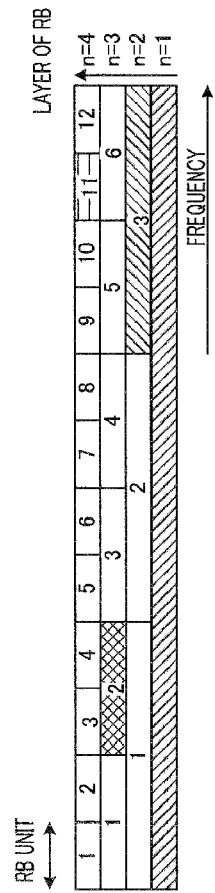
FIG. 12B shows an operation example of generating a CQI signal according to Embodiment 5 of the present invention.

FIG. 12A shows the groups of the maximum SIRs in the layers, and FIG. 12B shows an operation example of generating a CQI signal according to Embodiment 5 of the present invention. As shown in FIG. 12A, the SIR of the eleventh group is maximum for layer 4 (n=4), the SIR of group 6 is maximum for layer 3 (n=3), and the SIR of group 3 is maximum for layer 2 (n=2).

At this time, RBs of group 6 where the average SIR is maximum in layer 3 overlap with the eleventh group where the SIR is selected as the maximum in the fourth next higher layer. Then, as shown in FIG. 12B, group 2 where the SIR is the second greatest SIR in layer 3 is subjected to CQI reporting, and a CQI signal corresponding to the second greatest SIR is generated.

In the example of FIGS. 12A and 12B, by changing the RB subjected to CQI reporting in layer 3 from group 6 to group 2, group 3 selected as the maximum SIR in layer 2 does not overlap with the RB group selected in the next higher layer (i.e. layer 3), so that group 3 is subjected to CQI reporting in layer 2. The RB group in layer 1 always overlaps with the RB group selected in the next higher layer, but there is only one RB group in layer 1, and therefore there is not an RB group of the second greatest SIR and the reporting target does not change.

In this way, according to Embodiment 5, when an RB group where the SIR is maximum in one layer shares an overlapping part with the RB group selected as a CQI reporting target in a next higher layer, by generating a CQI signal of an RB group of the second greatest SIR in the layer, it is possible to reduce overlapped CQIs reported and improve the accuracy of CQIs while the number of CQI reporting bits is kept.

Embodiment 6

Figure 13:
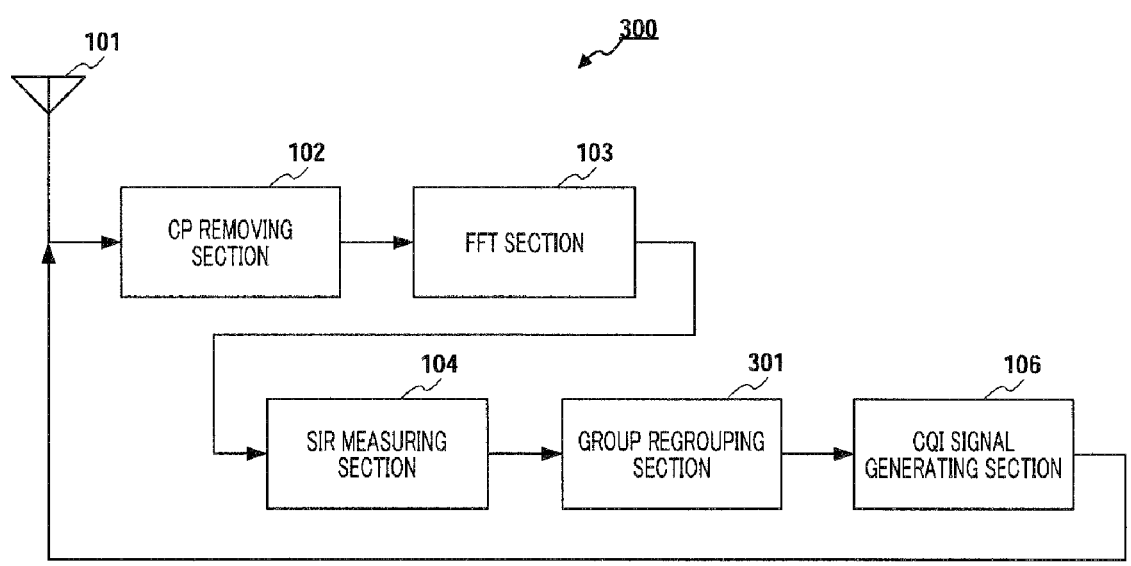
FIG. 13 is a block diagram showing the configuration of the UE according to Embodiment 6 of the present invention.

FIG. 13 is a block diagram showing the configuration of UE 300 according to Embodiment 6 of the present invention. In FIG. 13, the same reference numerals as FIG. 3 are assigned to the same parts in FIG. 3, and overlapping descriptions thereof will be omitted. FIG. 13 is different from FIG. 3 in changing maximum value selecting section 105 to group regrouping section 301.

In FIG. 13, based on the SIR outputted from SIR measuring section 104, group regrouping section 301 regroups the RB groups in layer 2 and layer 3. To be more specific, group regrouping section 301 firstly selects the RB group of the maximum SIR in layer 4, and regroups RB groups not including the part of an RB group in layer 3 corresponding to the selected RB group. Group regrouping section 301 selects an RB group of the maximum SIR in the regrouped third layer. Further, in layer 2, group regrouping section 301 regroups RB groups by not including the RB groups selected in layer 4 and third layer, and selects the RB group of the maximum SIR among the regrouped RB groups. Group regrouping section 301 outputs the selected RB group number and its SIR in each layer to CQI signal generating section 106.

Figure 14:
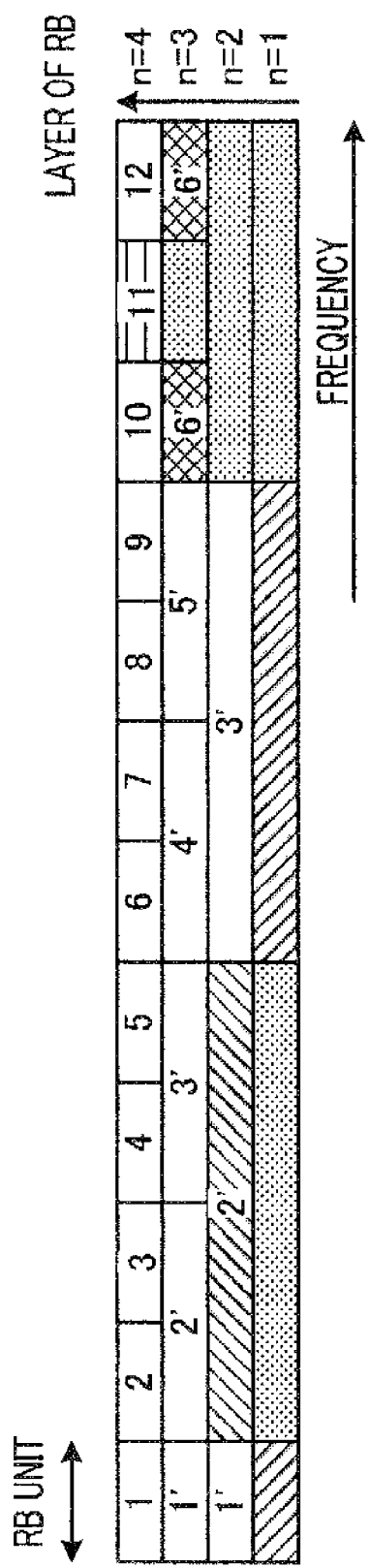
FIG. 14 shows an operation example of regrouping the groups according to Embodiment 6 of the present invention.

FIG. 14 shows an operation example of regrouping the groups according to Embodiment 6 of the present invention. Also here, before groups are regrouped, as shown in FIG. 12A, the SIR of group 11 is maximum for layer 4 (n=4), the SIR of group 6 is maximum for layer 3 (n=3), and the SIR of group 3 is maximum for layer 2 (n=2).

At this time, group 11 is selected in layer 4 and, in layer 3, RB groups are regrouped by not including the part overlapping with group 11 selected in layer 4. In the case of FIG. 14, in regrouped layer 3, the part corresponding to groups 10 and 12 in layer 4 is group 6', the part corresponding to the eighth and ninth groups in layer 4 is group 5', and the same applies to the regroupment of the RB groups.

Then, group 6' is selected in regrouped layer 3, and, in layer 2, RB groups are regrouped by not including the parts overlapping with group 11 selected in layer 4 and the group 6' selected in layer 3. In the case of FIG. 14, in regrouped layer 2, the part corresponding to groups 4' and 5' in layer 3 is group 3', the part corresponding to groups 2' and 3' in layer 3 is the 2' group, and the part corresponding to group 1' in layer 3 is group 1'.

In layer 2 regrouped as such, group 2' is selected. In layer 1, the RBs not including the part overlapping with group 11 selected in layer 4, group 6' selected in layer 3 and group 2' selected in layer 2, are subjected to CQI reporting. That is, a CQI signal is generated corresponding to an average SIR of the RBs subjected to CQI reporting.

The node B according to Embodiment 6 of the present invention is the same in the configurations as shown in FIG. 5 of Embodiment 1, and partly different in functions. The different parts from Embodiment 1 will be explained with reference to FIG. 5.

In FIG. 5, based on the CQI signals outputted from CQI signal demultiplexing section 202, MCS generating section 203 identifies the RB groups in the layers regrouped in UE 300. To be more specific, as in the rules of regroupment in UE 300, in layer 3, MCS generating section 203 identifies the regrouped RB groups not including the RB groups where CQIs are reported in layer 4. In layer 2, MCS generating section 203 knows the regrouped RB groups by not including the RB groups where CQIs are reported in regrouped layer 3. As such, based on the reported CQIs for the regrouped RB groups, MCS generating section 203 generates MCSs per RB.

In this way, according to Embodiment 6, by regrouping RB groups not including the part overlapping RB groups selected as CQI reporting targets in higher layers, and by generating CQI signals for the regrouped RB groups, it is possible to improve the accuracy of CQIs for the RBs other than the overlapping parts with the higher layers.

Although cases have been explained with embodiments where the RBs are layered as four the present invention is not limited to this and RBs may be layered as three or more. Further, although cases have been explained where the number of RBs are twelve, the present invention is not limited to this.

Further, although cases have been explained with embodiments where the RBs are layered, the present invention is not limited to this, and different formats showing combinations of RBs may also be applied.

Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2006-175819, filed on Jun. 26, 2006, and Japanese Patent Application No. 2006-322347, filed on Nov. 29, 2006, including the specifications, drawings and abstracts, are incorporated herein by reference in their entirety.

INDUSTRIAL APPLICABILITY

The radio communication apparatus and CQI generation method according to the present invention is able to further reduce the total number of CQIs for layered RBs when the CQIs are reported on a per layer basis, and is applicable to, for example, mobile communication systems represented by 3GPP.

The invention claimed is:

1. A radio communication apparatus comprising:
   a measuring section that measures received quality on a per resource block basis; and
   a channel quality indicator generating section that, where channel quality indicators are provided in layers such that one layer is formed with a plurality of groups each comprising the same number of resource blocks, a group comprising more resource blocks forming a lower layer and a group comprising fewer resource blocks forming a higher layer, based on the measured received quality, generates channel quality indicators to be reported per layer in a longer cycle for the lower layer and in a shorter cycle for the higher layer.

2. The radio communication apparatus according to claim 1, wherein the channel quality indicator generating section generates the channel quality indicators such that fewer bits are assigned to the lower layer and more bits are assigned to the higher layer in the channel quality indicators.

3. The radio communication apparatus according to claim 1, wherein, when the channel quality indicators grouped into levels are represented using higher bits designating the groups and lower bits designating the channel quality indicators, the channel quality indicator generating section generates the lower bits in a longer cycle for the lower layer and in a short cycle for the higher layer.

4. The radio communication apparatus according to claim 3, wherein the channel quality indicator generating section generates the lower bits such that fewer bits are assigned to the lower layer and more bits are assigned to the higher layer in the CQIs.

5. The radio communication apparatus according to claim 1, wherein, in each layer other than a highest layer, the channel quality indicator generating section generates a channel quality indicator based on the measured received quality with respect to a group not including a resource block overlapping with a resource block for which a channel quality indicator has been generated in a higher layer.

6. The radio communication apparatus according to claim 1, wherein, in each layer other than a highest layer, when a resource block overlapping with a resource block in a next higher layer shows highest received quality, the channel quality indicator generating section generates a channel quality indicator with respect to a resource block showing a next highest quality.

7. The radio communication apparatus according to claim 1, comprising a group regrouping section that, in each layer other than a highest layer, regroups a group not including a resource block overlapping with a resource block for which a channel quality indicator has been generated in a higher layer,
   wherein the channel quality indicator generating section generates a channel quality indicator with respect to the regrouped group based on the measured received quality.

8. A channel quality indicator generation method comprising the steps of:
   measuring received quality on a per resource block basis; and
   generating channel quality indicators to be reported per layer, in a longer cycle for a lower layer and in a shorter cycle for a higher layer, where channel quality indicators are provided in layers such that one layer is formed with a plurality of groups each comprising the same number of resource blocks, a group comprising more resource blocks forming the lower layer and a group comprising fewer resource blocks forming the higher layer, based on the measured received quality.

* * * * *